United States Patent
Jardin et al.

(10) Patent No.: US 7,308,713 B1
(45) Date of Patent: Dec. 11, 2007

(54) LINK-LOCK DEVICE AND METHOD OF MONITORING AND CONTROLLING A LINK FOR FAILURES AND INTRUSIONS

(75) Inventors: Cary A. Jardin, San Diego, CA (US); Eric Varsanyi, Plymouth, MN (US); Phil J. Duclos, Longmont, CO (US); Vincent M. Padua, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 09/721,785

(22) Filed: Nov. 22, 2000

(51) Int. Cl.
*G06F 11/00* (2006.01)
*G06F 11/30* (2006.01)
*G06F 15/173* (2006.01)

(52) U.S. Cl. .............. 726/23; 713/189; 709/223; 709/224

(58) Field of Classification Search .......... 713/201, 713/200, 164, 151, 152; 726/22–23
See application file for complete search history.

(56) References Cited

U.S. PATENT DOCUMENTS 5,896,499 A * 4/1999 McKelvey ............ 726/11
6,079,020 A * 6/2000 Liu .................... 713/201
6,473,863 B1 * 10/2002 Genty et al. ............ 726/3
6,583,714 B1 * 6/2003 Gabou et al. .......... 340/5.54

FOREIGN PATENT DOCUMENTS

EP          0 965 902       12/1999
WO       WO 98/37490        8/1998

OTHER PUBLICATIONS

Xubin et al, "A performance analysis of secured HTTP protocol".*
Microsoft Press Computer Dictionary, 3rd Ed., 1997, p. 239.
Application No. 01819255.6 Chinese Office Action dated Mar. 10, 2006.

* cited by examiner

*Primary Examiner*—Kim Vu
*Assistant Examiner*—Ponnoreay Pich
(74) *Attorney, Agent, or Firm*—Blakely, Sokoloff, Taylor & Zafman LLP

(57) ABSTRACT

A link lock system for a network includes a computer, a network interface device, a bus monitor, and a security switch. The network interface device provides the computer with access to the network. The bus monitor monitors a link between the network interface device and the computer. The bus monitor reports detected failures or intrusions. The security switch switches the link from a non-secured mode to a secured mode when a report of the detected failures or intrusions is received from the bus monitor.

14 Claims, 4 Drawing Sheets

LINK-LOCK DEVICE AND METHOD OF MONITORING AND CONTROLLING A LINK FOR FAILURES AND INTRUSIONS

TECHNICAL FIELD

This invention relates to securing information across networks, and more particularly to monitoring and controlling a link between a network device and a computer for failures or intrusions.

BACKGROUND

The client/server model is often used to deliver information across a network. In this model, a client computer connects to a server on which information resides. The client computer may request the services of the server, such as delivering information. Other services may include searching for and sending back information, such as when a database on a network is queried.

A conceptual diagram of a computer network 100, such as the Internet, is illustrated in FIG. 1. The network 100 may comprise small computers 102-114 and large computers 120, 122, commonly used as servers. In general, small computers 102-114 are "personal computers" or workstations and are the sites at which a user operates the computer to make requests for data from other computers or servers on the network 100.

A connection to the network 100 may be made through a network device 130-136 that provides an interface between the requesting computer (i.e. client) and the network infrastructure 140. The network device 130-136 may also be used to provide an interface between the network infrastructure 140 and the server 120, 122. The interface between the client 102-114, the server 120-122, and the network infrastructure 140 may be defined by a protocol referred to as the Hypertext Transfer Protocol (HTTP). The HTTP is the language that Web clients and servers use to communicate with each other. A secure version of this protocol, HTTP-S, is often used to provide communication between the network infrastructure 140 and the network device 130-136. However, the link between the network device 130-136 and the server 120-122, or the network device 130-136 and the small computer 102-114, is often configured in a non-secured mode.

DESCRIPTION OF DRAWINGS

These and other features and advantages of the invention will become more apparent upon reading the following detailed description and upon reference to the accompanying drawings.

DETAILED DESCRIPTION

The present disclosure includes a link-lock system coupled to the network device to monitor and control the security mode of a link between the network device and the server or the client. The security mode of the link may be controlled in accordance with the status of the link. For example, if a link failure or intrusion is detected, the security mode of the link is maintained in a secured state rather than converted into a non-secured state.

Figure 1:
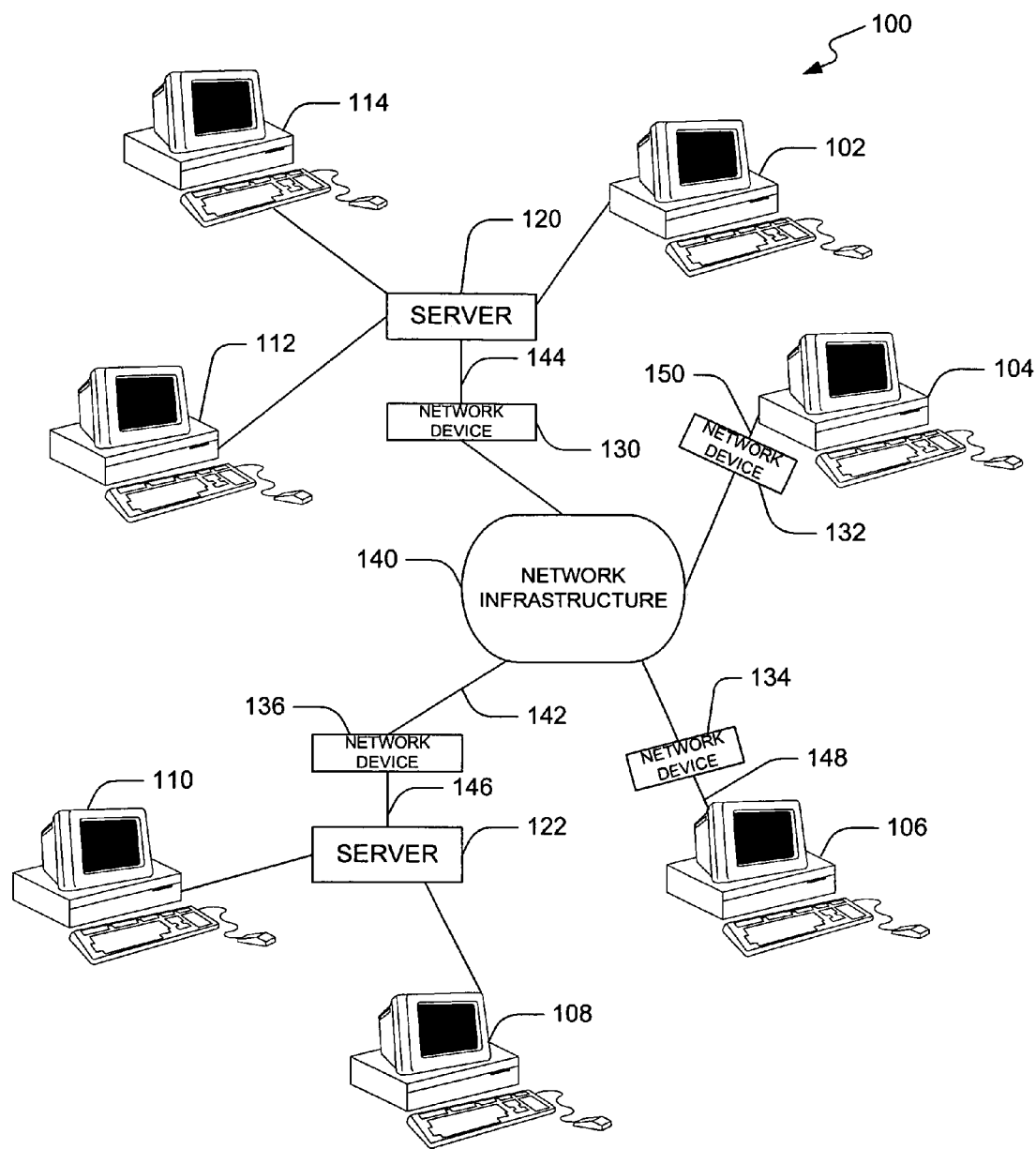
FIG. 1 is conceptual diagram of a computer network.
Figure 2:
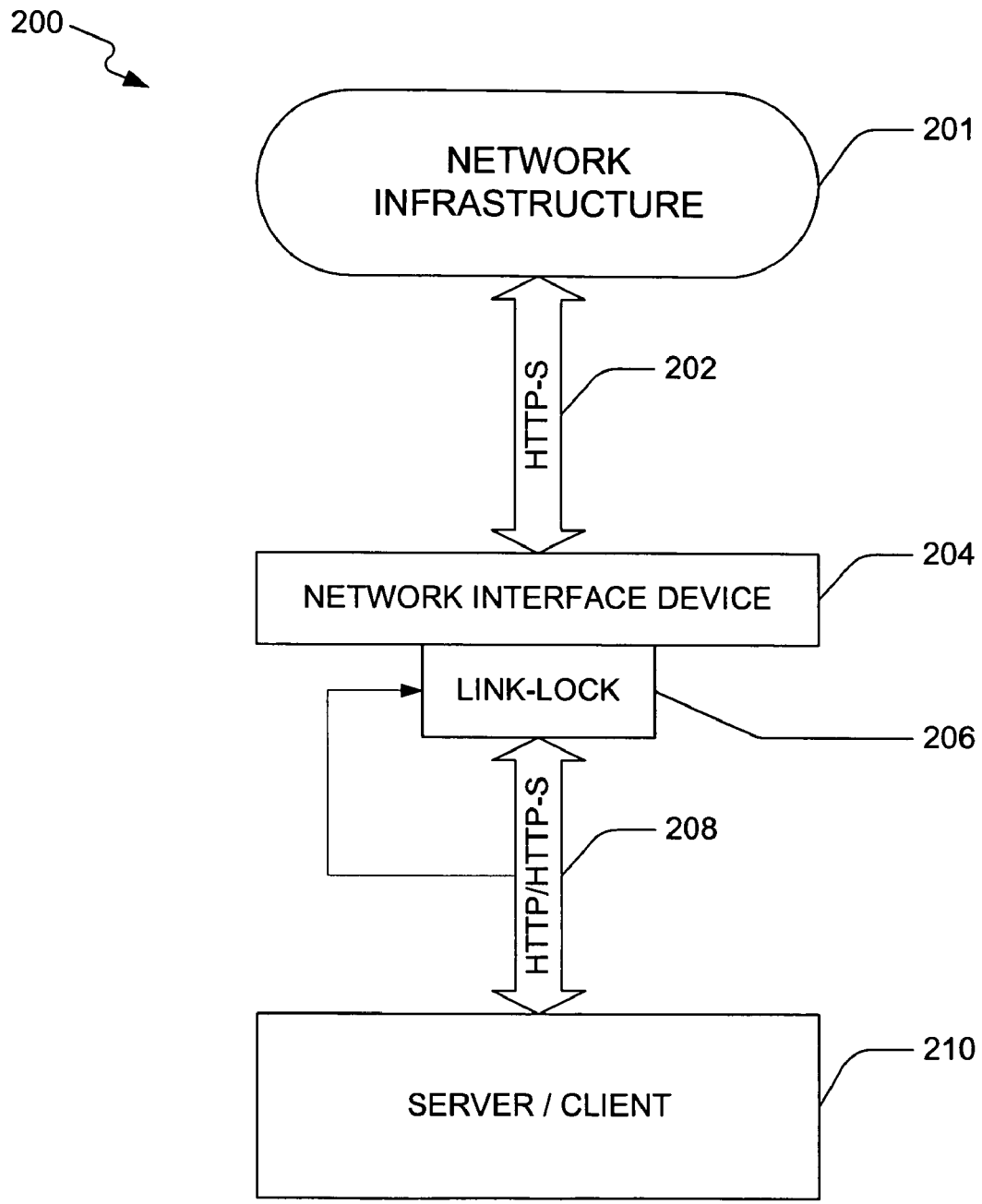
FIG. 2 is a block diagram of a network system including a link lock system.

An embodiment of a network 200 having the link-lock system 206 is illustrated in FIG. 2. The network 200 includes a network interface device 204 configured to interface with the network infrastructure 201 through a link 202 operating in a secured protocol (e.g., HTTP-S). The HTTP-S provides a variety of security mechanisms to HTTP clients and servers, providing the security service options appropriate to a wide range of potential end uses.

The network 200 further includes a link-lock system 206 coupled to the network interface device 204. The link-lock system 206 monitors security status of the link 208 between the network interface device 204 and a computer used to connect to the network, such as the server or the client 210. In the illustrated embodiment of FIG. 2, when the link-lock system 206 determines that a link failure or intrusion is detected, the security protocol of the link 208 is maintained in an HTTP-S mode rather than converted into an HTTP mode. The link failure or intrusion may include physical tampering or alteration of any part of the link 208 between the network interface device 204 and the server/client 210. The failure or intrusion may also include a software attack or modification of the link 208 from external sources.

Figure 3:
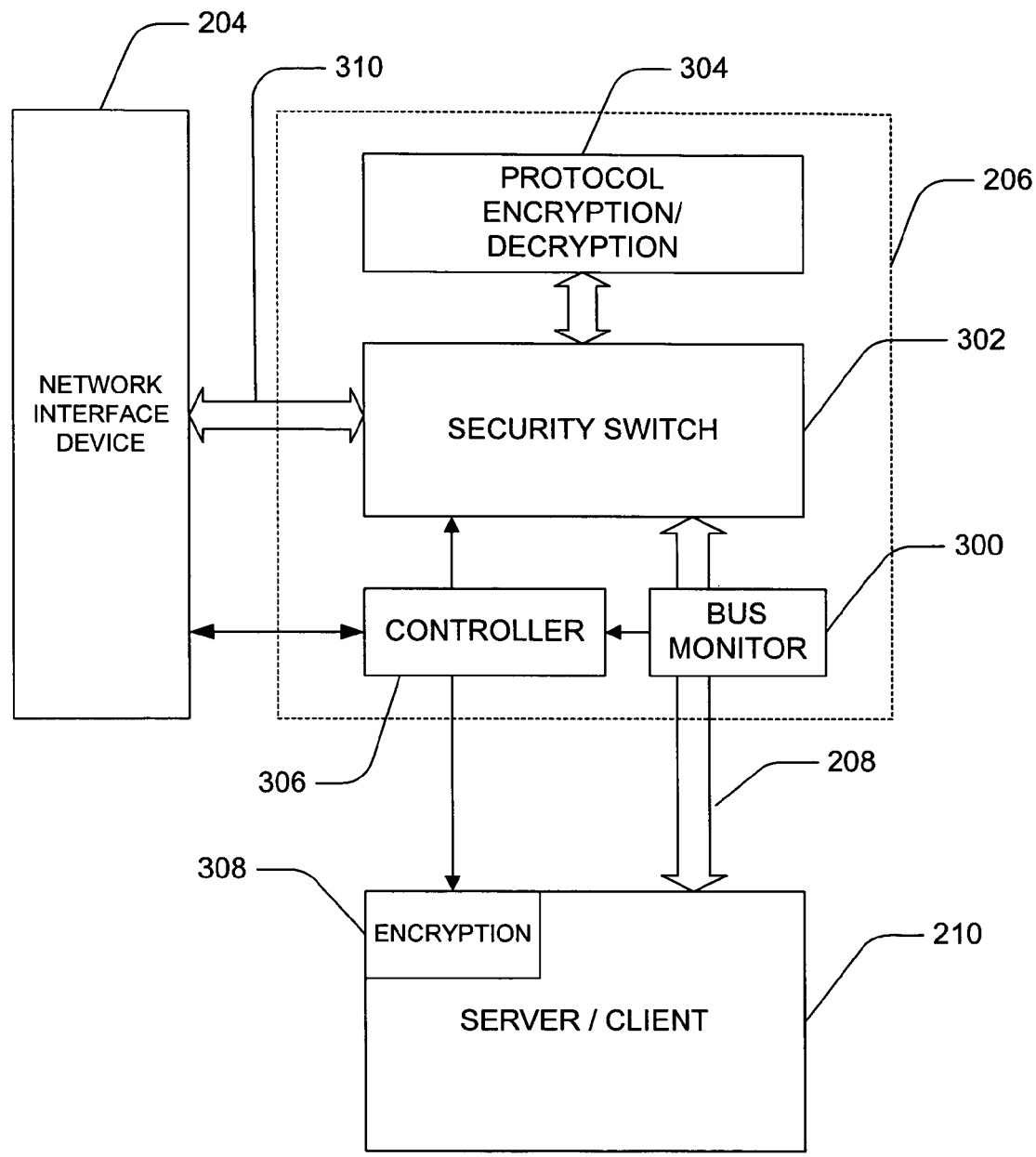
FIG. 3 is a block diagram of a link lock system in accordance with an embodiment of the present disclosure.

A block diagram of the link-lock system 206 in accordance with an embodiment of the present disclosure is shown in FIG. 3. The link-lock system 206 includes a bus monitor 300, a security switch 302, an encryption/decryption element 304, and a controller 306. The link-lock system 206 may also maintain a protocol encryption element 308 on the server/client 210.

The security switch 302 receives data from the network interface device 204 or the server/client 210. In the illustrated embodiment, the security switch 302 commands the encryption/decryption element 304 to convert the received data from a secured protocol to a non-secured protocol, when the data is received from a network link 310 and is placed onto the link 208. The security switch 302 may command the encryption/decryption element 304 to convert the received data from a non-secured protocol to a secured protocol, when the data is received from the link 208 and is placed onto the network link 310. The converted data is then sent to the server/client 210 or the network interface device 204 using an appropriate protocol.

The bus monitor 300 monitors the link 208 for possible link failure or intrusion. When a link failure or intrusion is detected on the link 208, the bus monitor 300 notifies the controller 306. The controller 306, upon receipt of the link failure, directs the security switch 302 to keep the link 208 in a secured protocol mode. The controller 306 may also direct the protocol encryption element 308 in the server/client 210 to convert the data being placed on the link 208 using a secured protocol. In some embodiments, the functions of the security switch 302, the bus monitor 300, and the controller 306 may be combined into a single element.

Figure 4:
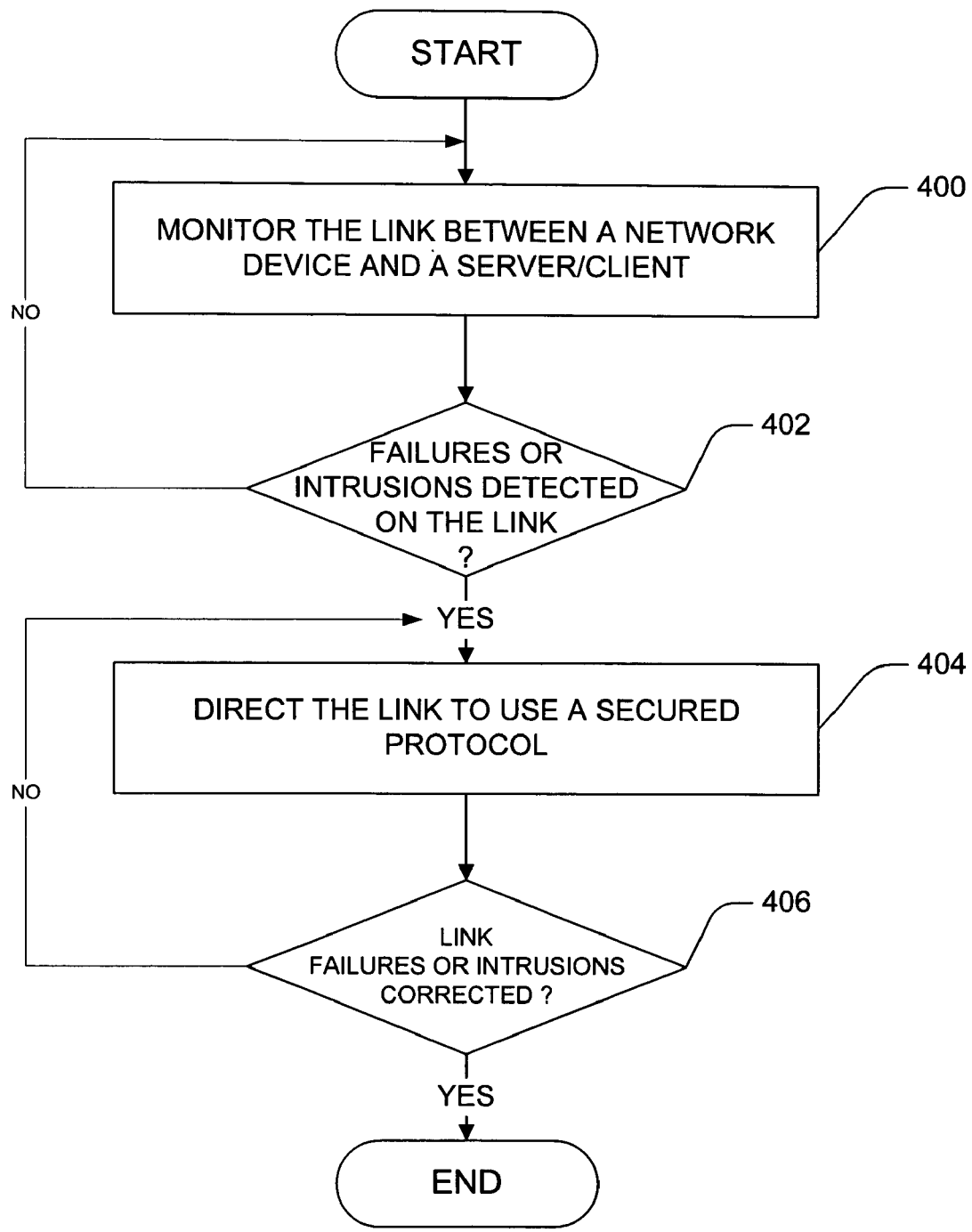
FIG. 4 illustrates a method for monitoring and controlling a link for failures or intrusions according to an embodiment.

FIG. 4 illustrates a method for monitoring and controlling a link for failures or intrusions. The method includes monitoring the link between a network device and a server/client, at 400. When failures or intrusions are detected on the link, at 402, the link is directed to use a secured protocol at 404. Data sent across this link remains in a secured protocol mode until a network manager determines that the failures or intrusions have been corrected at 406.

Numerous variations and modifications of the invention will become readily apparent to those skilled in the art.

Accordingly, the invention may be embodied in other specific forms without departing from its spirit or essential characteristics.

What is claimed is:

1. A link lock system for a network, comprising:
   a computer;
   a network interface device to provide the computer with access to the network;
   a bus monitor to monitor a first link between the network interface device and the computer, where the bus monitor reports detected failures or intrusions; and
   a security switch to switch the first link from a non-secured mode using an HTTP protocol to a secured mode using an HTTP-S protocol when a report of the detected failures or intrusions is received from the bus monitor,
   wherein data sent across the first link remains in the secured mode using the HTTP-S protocol when the report of the detected failures or intrusions is received from the bus monitor and is prevented from switching to the non-secured mode using the HTTP protocol until the detected failures or intrusions are corrected.

2. The system of claim 1, wherein the computer is a server.

3. The system of claim 1, wherein the network operates in the secured mode using the HTTP-S protocol.

4. The system of claim 1, further comprising:
   a controller that receives the report from the bus monitor and sends a control signal to the network interface device, the security switch, and the computer.

5. The system of claim 4, further comprising:
   an encryption element in the computer, where the encryption element converts data placed on the first link using the secured mode when the control signal is received from the controller.

6. A system for a server, comprising:
   an interface device to provide the server with access to a network; and
   a controller to monitor a link between the interface device and the server, where the controller switches the link from a non-secured protocol using an HTTP protocol to a secured protocol using an HTTP-S protocol when failures or intrusions are detected on the link,
   wherein data sent across the link remains using the HTTP-S protocol when the failures or intrusions are detected and is prevented from switching to HTTP protocol until the detected failures or intrusions are corrected.

7. The system of claim 6, wherein the network is the Internet.

8. The system of claim 6, wherein the controller sends a control signal to the server when failures or intrusions are detected on the link.

9. The system of claim 8, further comprising:
   an encryption element in the server, where the encryption element converts data placed on the link by the server using the secured protocol when the control signal is received from the controller.

10. A method, comprising:
    monitoring a link between a network device and a computer;
    first directing the link to use an HTTP-S protocol when failures or intrusions are detected on the link; and
    second directing the link to revert to an HTTP protocol when the detected failures or intrusions have been corrected,
    wherein data sent across the link remains using the HTTP-S protocol when the failures or intrusions are detected and is prevented from switching to HTTP protocol until the detected failures or intrusions are corrected.

11. The method of claim 10, wherein the computer is a server.

12. The method of claim 10, wherein the link reverts to the HTTP protocol when a network manager determines that the detected failures or intrusions have been corrected.

13. An apparatus comprising a machine-readable storage medium having executable instructions that enable the machine to:
    monitor a link between a network device and a server;
    first directing the link to use an HTTP-S protocol when failures or intrusions are detected on the link; and
    second directing the link to revert to an HTTP protocol when the detected failures or intrusions have been corrected,
    wherein data sent across the link remains using the HTTP-S protocol when the failures or intrusions are detected and is prevented from switching to HTTP protocol until the detected failures or intrusions are corrected.

14. The apparatus of claim 13, wherein the link reverts to the HTTP protocol when a network manager determines that the detected failures or intrusions have been corrected.

* * * * *